US010076736B2

(12) United States Patent
Degaleesan et al.

(10) Patent No.: US 10,076,736 B2
(45) Date of Patent: Sep. 18, 2018

(54) MULTIPLE-BED DOWNFLOW REACTOR COMPRISING A MIXING DEVICE, USE OF SAID REACTOR, AS WELL AS MIXING METHOD

(71) Applicant: SHELL OIL COMPANY, Houston, TX (US)

(72) Inventors: Sujatha Degaleesan, Katy, TX (US); Benoit Witkamp, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 521 days.

(21) Appl. No.: 14/434,109

(22) PCT Filed: Oct. 8, 2013

(86) PCT No.: PCT/EP2013/070972
§ 371 (c)(1),
(2) Date: Apr. 8, 2015

(87) PCT Pub. No.: WO2014/056935
PCT Pub. Date: Apr. 17, 2014

(65) Prior Publication Data
US 2015/0258517 A1    Sep. 17, 2015

(30) Foreign Application Priority Data

Oct. 10, 2012  (EP) ..................................... 12187887

(51) Int. Cl.
*B01J 4/00*    (2006.01)
*B01J 8/04*    (2006.01)
(Continued)

(52) U.S. Cl.
CPC ............. *B01J 8/0453* (2013.01); *B01J 4/002* (2013.01); *B01J 4/004* (2013.01); *B01J 8/0492* (2013.01);
(Continued)

(58) Field of Classification Search
CPC . B01J 4/004; B01J 2208/00911; B01J 8/0453
(Continued)

(56) References Cited

U.S. PATENT DOCUMENTS 2,632,692 A * 3/1953 Korin ..................... B01J 8/0492
                                                                422/638
3,787,189 A * 1/1974 Muffat ................... B01J 8/0492
                                                                208/108
(Continued)

FOREIGN PATENT DOCUMENTS

EP          716881       6/1996
EP          1208907      5/2002
(Continued)

*Primary Examiner* — Jennifer A Leung
(74) *Attorney, Agent, or Firm* — Charles W. Stewart

(57) ABSTRACT

The present invention relates to a multiple-bed downflow reactor comprising vertically spaced beds of solid contact material and a mixing device positioned in an inter bed space between adjacent beds. The mixing device comprises a loop of first nozzles distributed around a vertical axis and arranged for ejecting a fluid in a first ejection direction into said inter bed space, on the one hand, and a loop of second nozzles distributed around the vertical axis and arranged for ejecting a fluid in a second ejection direction into said inter bed space, on the other hand. The first ejection direction is directed inwardly with respect to the loop of first nozzles. The second ejection direction is directed outwardly with respect to the loop of second nozzles.

10 Claims, 3 Drawing Sheets

(51) Int. Cl.
*B01J 19/26* (2006.01)
*C10G 49/00* (2006.01)
*C10G 65/02* (2006.01)
*C10G 65/12* (2006.01)

(52) U.S. Cl.
CPC ............. *B01J 8/0496* (2013.01); *B01J 19/26* (2013.01); *C10G 49/002* (2013.01); *C10G 65/02* (2013.01); *C10G 65/12* (2013.01); *B01J 2208/00353* (2013.01); *B01J 2208/00362* (2013.01); *B01J 2208/00371* (2013.01); *B01J 2208/00849* (2013.01); *B01J 2208/00902* (2013.01); *B01J 2208/00911* (2013.01); *B01J 2208/027* (2013.01); *B01J 2219/00119* (2013.01)

(58) Field of Classification Search
USPC ....... 422/606, 607, 638, 644, 647, 648, 207, 422/632
See application file for complete search history.

(56) References Cited

U.S. PATENT DOCUMENTS

| | | |
|---|---|---|
| 4,960,571 A | 10/1990 | Bhagat et al. |
| 5,635,145 A | 6/1997 | De Hartog et al. |
| 2007/0248510 A1 | 10/2007 | Dean et al. |

FOREIGN PATENT DOCUMENTS

| | | |
|---|---|---|
| EP | 1477221 | 11/2004 |
| GB | 1276457 | 6/1972 |

* cited by examiner

MULTIPLE-BED DOWNFLOW REACTOR COMPRISING A MIXING DEVICE, USE OF SAID REACTOR, AS WELL AS MIXING METHOD

PRIORITY CLAIM

The present application is the National Stage (§ 371) of International Application No. PCT/EP2013/070972, filed Oct. 8, 2013, which claims priority from European Patent Application No. 12187887.0, filed Oct. 10, 2012, incorporated herein by reference.

The present invention relates to a multiple-bed downflow reactor comprising a mixing device, to the use of such a reactor in hydrocarbon processing, and to a mixing method for mixing liquid and gas in a multiple-bed downflow reactor.

Multiple-bed downflow reactors containing a number of superimposed reaction beds are used in the chemical and petroleum refining industries for effecting various processes such as catalytic dewaxing, hydrotreating and hydrocracking. In these processes a liquid phase is typically mixed with a gas phase and the fluids of these two phases pass over a particulate catalyst maintained in the reaction beds. As the fluids pass concurrently through a reaction bed, the distribution of liquid and gas across the reaction bed will tend to become uneven with adverse consequences with regard to the extent of reaction and also temperature distribution. In order to achieve a uniform distribution of liquid and gas and of temperature in the fluids entering the next lower reaction bed, a fluid mixing device, of which there are many different types, is usually placed between the reaction beds.

Such a fluid mixing device is for example known from EP-A-716881. This device discloses a fluid mixing device for use between the reaction beds of a multiple-bed downflow reactor. This known device comprises: a substantially horizontal collecting tray provided with a central gas passage and liquid passages around the central gas passage; a swirler, which swirler is located above the collecting tray around the central gas passage, and is provided with vanes defining a swirl direction and being arranged to impart a swirling motion to gas passing through the central gas passage so that the gas leaves the central gas passage as a swirl swirling in said swirl direction around a vertical axis; a circular tube with ejection nozzles located above the collecting tray and arranged for ejecting, in an ejecting direction, a fluid into the gas-liquid phase before said gas-liquid phase enters the swirler.

During normal operation, liquid descending from the upper reaction bed collects on the collecting tray where it accumulates to form a layer of liquid that covers the liquid passages so that flow of gas through them is precluded. The flow of gas into a lower portion of the reactor is passed through the swirler located on the collecting tray above and around the central gas passage and subsequently through the central passage. On entering the swirler, vanes impart a swirling motion to the gas which is only able to move downwardly through the central gas passage into the mixing chamber below the collecting tray. The direction of the swirl motion of the gas is defined by the vanes of the swirler and is around an essentially vertical swirl axis. The swirling motion of the gas promotes gas-gas interactions and thus equilibration of the gas phase. Liquid collected on the collecting tray passes through the liquid passages into the guide conduits. The guide conduits have injection nozzles injecting the liquid into the swirl of gas coming from the central gas passage.

In order to achieve a uniform distribution of liquid and gas and of temperature in the fluids entering the next lower reaction bed, a fluid mixing device, like the one of EP-A-716881 is frequently provided with a loop of ejection nozzles to eject a fluid into the gas-liquid phase before it enters the swirler. For this purpose one of the embodiments of EP-A-716881 has a so called quench ring arranged above the collecting tray. The inner side of this quench ring is provided with a plurality of ejection nozzles. In use a quench fluid is ejected into the gas passing from the upper bed to the swirler. EP-A-716881 is silent about the ejection direction of the ejection nozzles. It can only be seen in the drawing that these ejection nozzles are arranged on the inner side of the quench ring and face in an inward direction of the quench ring. However, from practise it is known that these ejection nozzles are directed in a horizontal plane, that the ejection direction is at an angle of about 20° with respect to the radial extending between the quench ejection nozzle and the centre of the reactor, and that the ejection direction is partly in the same direction as the swirl direction of the swirl imparted by the swirler.

The ejection direction of each quench ejection nozzle of EP-A-716881—as well as the ejection direction of each nozzle of the present invention—can at the location of each respective nozzle mathematically be represented by an arrow, called ejection vector. In turn each ejection vector of EP-A-716881—as well as each ejection vector of the present invention—can be represented by an orthogonal set of three vector components: a radial ejection vector extending perpendicular to the vertical axis, an axial ejection vector extending parallel to the vertical axis and a tangential ejection vector extending tangentially with respect to the vertical axis. Taking into account this representation, the ejection direction of EP-A-716881 as known from practise—as described in the preceding paragraph—can be represented as follows: axial ejection vector has a length zero (meaning it is absent) as the ejection is in horizontal direction; the radial ejection vector is, viewed from the associated ejection nozzle, directed towards the centre of the reactor (which corresponds to the vertical axis); and the tangential ejection vector is, viewed from the associated ejection nozzle, directed in the same direction as the swirl direction.

In a reactor with the above discussed mixing device known from EP-A-716881—here called reactor type a—, the mixing device has primarily a horizontal collecting tray with a central gas passage and a swirler located above the tray around the passage. Optionally, this mixing device can additionally be provided with a so called quench ring provided with inwardly directed quench nozzles. However, the prior art also discloses multiple-bed downflow reactors—here called reactor type b—having a mixing device which essentially only consists of a tubular ring with inwardly directed nozzles and which do not have additional mixing elements like the collecting tray with central passage and swirler of EP-A-716881; and multiple-bed downflow reactors—here called reactor type c—having a mixing device which comprises a tubular ring with inwardly directed nozzles as well as additional mixing elements other than the ones from EP-A-716881.

It is to be noted that the present invention relates to multiple-bed downflow reactors of type a, type b, type c as well as of other types.

EP-1,477,221 discloses a quench ring having nozzles, which may be located at various points so long as the quench produced by the injection points flows in a swirl (col. 9 lines 57—col. 10 line 1). Further, according to col. 8 lines 50-52, the quench injection is configured so as to cause a rotational current on the collection tray.

U.S. Pat. No. 4,960,571 shows in FIG. 4, without any textual explanation, as an alternative embodiment a sparger ring (47), which suggests it has nozzles facing in radial outward direction and nozzles facing in radial inward direction. Similar applies for GB-1,276,457 and its FIG. 4.

US 2007/0248510 discloses a dual gas-liquid sparger device for catalytic processing units. According to its FIG. 4 this sparger device has an inner sparger ring (36) provided with inwardly directed quench nozzles (62) and an outer sparger ring (38) with outwardly directed quench nozzles 64. According to US 2007/0248510—see paragraph [0046]—"the nozzles (62) and (64) should produce the same direction of rotation in the horizontal plane which contributes to effective mixing".

The aim of the present invention is to provide a multiple-bed downflow reactor with an improved mixing device arranged in an inter bed space between adjacent vertically spaced beds of solid contact material.

This object is according to a first aspect of the invention achieved by providing a multiple-bed downflow reactor comprising vertically spaced beds of solid contact material and a mixing device positioned in an inter bed space between adjacent beds, wherein the mixing device comprises:
  a loop of first nozzles distributed around a vertical axis and arranged for ejecting a fluid in a first ejection direction into said inter bed space;
  a loop of second nozzles distributed around the vertical axis and arranged for ejecting a fluid in a second ejection direction into said inter bed space wherein, for each first nozzle, the first ejection direction is represented in a local orthogonal set of three first ejection vectors comprised of a first radial ejection vector extending perpendicular to the vertical axis, a first axial ejection vector extending parallel to the vertical axis and a first tangential ejection vector extending tangentially with respect to the vertical axis;
wherein, for each second nozzle, the second ejection direction is represented in a local orthogonal set of three second ejection vectors comprised of a second radial ejection vector extending perpendicular to the vertical axis, a second axial ejection vector extending parallel to the vertical axis and a second tangential ejection vector extending tangentially with respect to the vertical axis;
wherein the first radial ejection vectors are directed to the vertical axis whilst the second radial ejection vectors are directed away from the vertical axis;
wherein the first tangential ejection vectors define a first circumferential direction around the vertical axis, the second tangential ejection vectors define a second circumferential direction around the vertical axis, and wherein the first and second circumferential direction are opposite to each other.

Thus according to the invention, the first ejection nozzles are directed such that the first radial ejection vector of each said first ejection nozzle is directed to the vertical axis, whilst the second ejection nozzles are directed such that the second radial ejection vector of each said second ejection nozzle is directed away from the vertical axis. As the radial ejection vectors are directed in a direction, these are represented by an arrow having a length larger than zero.

Experiments revealed that adding a loop of second nozzles to a loop of inwardly facing first nozzles enables a considerable increase in the performance of a multiple-bed downflow reactor when these second nozzles face outwardly. This increase in reactor performance becomes possible as the vertical height required by the inter bed space to achieving a temperature distribution which is as homogeneous as possible is considerably reduced. Applying the invention, the vertical height of the inter bed space can be reduced by 20% to 40%. Reducing the vertical height of the inter bed spaces means that the heights of the beds or the number of beds can be increased. This in turn allows for a considerable increase in performance of the reactor.

According to the invention the first and second circumferential direction are opposite to each other, i.e. the one is clockwise and the other is anticlockwise. It turns out that with this configuration, the temperature distribution is more homogeneous.

With respect to the ejection nozzles, it is noted that during normal use, the stream of fluid emerging from an ejection nozzle will, according to the invention, in general be a gas stream, but it is according to the invention not excluded that the stream is a mixture of a liquid and a gas. In the field of hydrocarbon processing, the fluid is in general gaseous hydrogen optionally comprising light carbons as an additive. Further, with respect to the ejection nozzles, it is noted that the stream emerging from a said ejection nozzle in said ejection direction can be jet-shaped, fan-shaped, cone-shaped, etcetera. The ejection direction will be the main direction. Further, the temperature of the fluid ejected by the nozzles will, according to the invention, in general be lower than the temperature of the medium into which it is ejected.

According to a further embodiment of the reactor according to the first aspect of the invention, the first axial ejection vector and/or the second axial ejection vector have a length of zero. In other words, this means that the first and second ejection nozzles are both directed to eject the fluid in a horizontal plane. This configuration reduces the vertical height of the inter bed space.

Simulative calculations show for the first ejection nozzles that a homogeneous temperature distribution is obtained when the first ejection directions and associated first radial ejection vectors of said first ejection nozzles define an angle of more than 5°, such as at least 10°, and that this distribution tends to improve when said angle is 15° or more. Simulative calculations further show that the improved homogeneous temperature tends to reduce when this angle becomes larger than 35°, and that this reduction appears to start when this angle becomes larger than 30°. In case the medium passing in vertical direction through the inter bed space is not subjected to a swirl motion around a vertical axis due to baffles or other constructive parts, the fluid ejected by the first ejection nozzles might impart the medium such a swirl motion.

According to a further embodiment of the reactor according to the first aspect of the invention, the first ejection directions and associated first radial ejection vectors of said first ejection nozzles consequently define an angle in the range of [5°, 35°], such as in the range of [10°, 30°] or in the range of [10°, 25°], like in the range of [15°, 25°].

Simulative calculations show for the second ejection nozzles that a homogeneous temperature distribution is obtained when the second ejection directions and associated second radial ejection vectors of said second ejection nozzles define an angle of more than 5°, such as at least 7.5°, and that this distribution tends to improve when said angle is 10° or more, such as 15° or more. Simulative calculations further show that the improved homogeneous temperature tends to reduce when this angle becomes larger than 35°, and that this reduction appears to start when this angle becomes larger than 30°. However, in it is noted that although the homogeneity of the temperature distribution is better when—in accordance with the invention—the circumferential directions defined by the first and second tangential ejection vectors are opposite to each other, the improvement in homogeneity of the temperature distribution is also clearly noticeable when these circumferential directions are in the same direction (i.e. both clockwise or both anticlockwise).

According to a further embodiment of the reactor according to the first aspect of the invention, the second ejection directions and associated second radial ejection vectors of said second ejection nozzles consequently define an angle in the range of [0°, 35°], such as in the range of [0 °, 30°] or in the range of [7.5°, 25°], like in the range of [15°, 25°].

With respect to the angles between the ejection direction and associated radial ejection vector, it is noted that these are expressed in degrees, wherein an angle of 360° corresponds with a (full) circle.

According to a further embodiment of the reactor according to the first aspect of the invention, the mixing device further comprises a tubular ring carrying the first nozzles and/or the second nozzles. The tubular ring might serve as a common feed line for all nozzles. The first nozzles will preferably be arranged on the inner side of tubular ring, whilst the second nozzles will preferably be arranged on the outer side tubular ring.

According to a further embodiment of the reactor according to the first aspect of the invention, wherein the reactor comprises a reactor vessel housing said vertically spaced beds and inter bed spaces between adjacent beds, each bed comprises a support grid defining the lower side of the bed and a distribution tray defining the upper side of the bed, wherein the upper side of each inter bed space is defined by the support grid of the adjacent bed above said inter bed space, wherein the lower side of each inter bed space is defined by the distribution tray of the adjacent bed below said inter bed space, wherein the mixing device is arranged in the inter bed space.

According to a further embodiment of the reactor according to the first aspect of the invention, the inter bed space is, except for the mixing device, essentially empty of other constructional parts.

According to a second aspect, the invention also relates to the use of a reactor according to the first aspect of the invention in hydrocarbon processing, such as in a hydrotreating and/or hydrocracking process.

According to a third aspect, the invention also relates to a mixing method for distributing a fluid into a liquid and/or gas in a multiple-bed downflow reactor having an inter bed space between two adjacent beds, such as a hydrocarbon processing reactor, like a hydrocracker; wherein the fluid is ejected into the inter bed space by a loop of first nozzles and a loop of second nozzles; wherein both the first and second nozzles are distributed around a vertical axis of the reactor and arranged in the inter bed space; wherein each first nozzles ejects the quench fluid in a first ejection direction and each second nozzle ejects the quench fluid in a second ejection direction; wherein the first ejection direction is directed inwardly with respect to the loop of first nozzles; and wherein the second ejection direction is directed outwardly with respect to the loop of second nozzles. Taking into account the earlier discussed representation of an ejection direction in an orthogonal set of three ejection vectors, this third aspect of the invention can—in analogy with the first aspect of the invention—also be worded as relating to a mixing method for mixing a liquid and gas in a multiple-bed downflow reactor having an inter bed space between two adjacent beds, such as a hydrocarbon processing reactor, like a hydrocracker; wherein a fluid is ejected into the inter bed space by a loop of first nozzles and a loop of second nozzles; wherein both the first and second nozzles are distributed around a vertical axis of the reactor and arranged in the inter bed space; wherein each first nozzles ejects the quench fluid in a first ejection direction and each second nozzle ejects the quench fluid in a second ejection direction; wherein, for each first nozzle, the first ejection direction is represented in a local orthogonal set of three first ejection vectors comprised of a first radial ejection vector extending perpendicular to the vertical axis, a first axial ejection vector extending parallel to the vertical axis and a first tangential ejection vector extending tangentially with respect to the vertical axis; wherein, for each second nozzle, the second ejection direction is represented in a local orthogonal set of three second ejection vectors comprised of a second radial ejection vector extending perpendicular to the vertical axis, a second axial ejection vector extending parallel to the vertical axis and a second tangential ejection vector extending tangentially with respect to the vertical axis; wherein the first radial ejection vectors are directed to the vertical axis whilst the second radial ejection vectors are directed away from the vertical axis wherein the first tangential ejection vectors define a first circumferential direction around the vertical axis, and wherein the second tangential ejection vectors define a second circumferential direction around the vertical axis; and wherein the first and second circumferential direction are opposite to each other.

The invention will now be further described by way of example with reference to the accompanying drawings, in which.

In the drawings like parts are denoted by like reference numerals.

Figure 2:
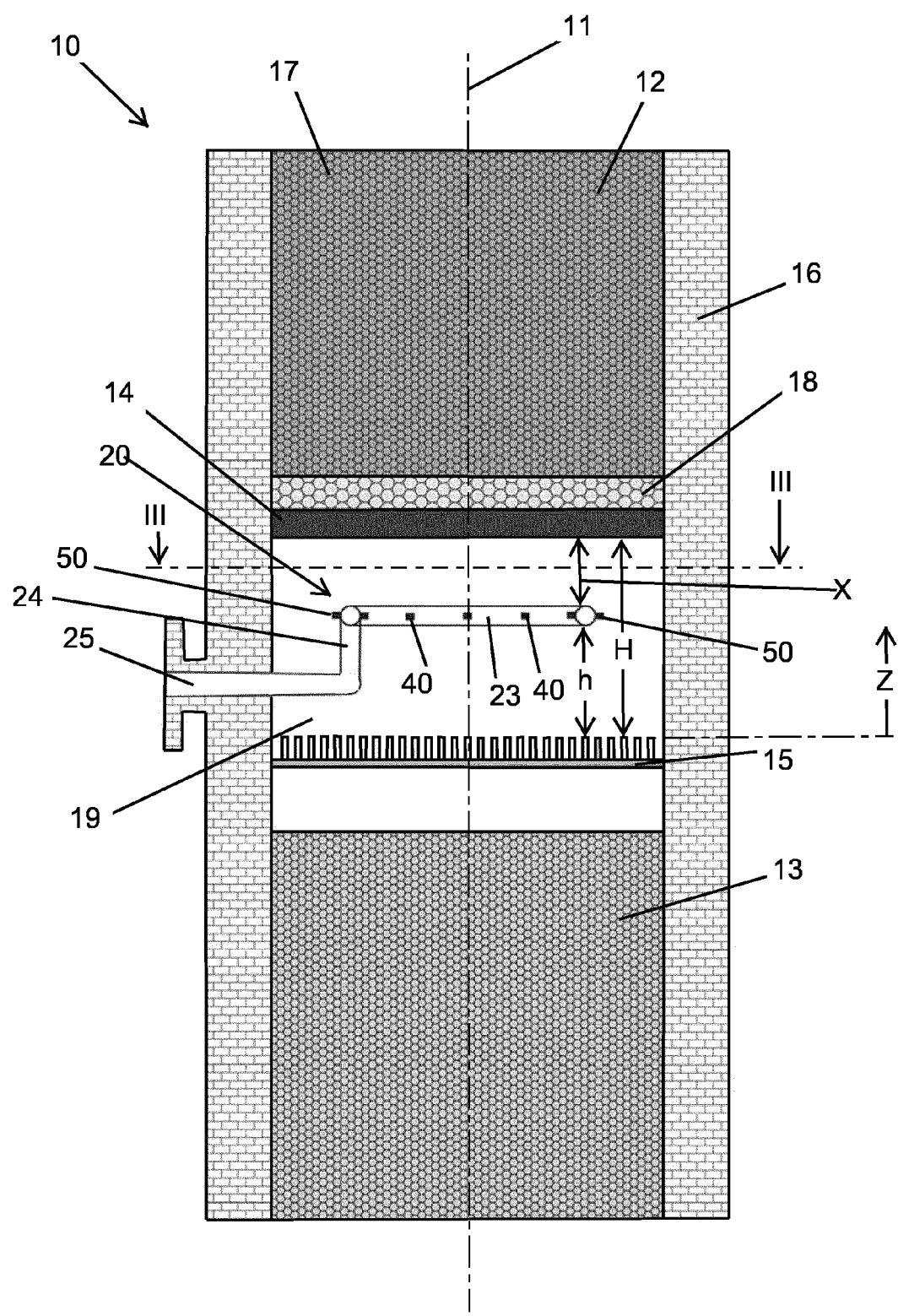
FIG. 2 shows schematically, in vertical cross section a part of a reactor according to the invention.

FIG. 2 shows a vertical cross-section of a portion of a multiple bed downflow reactor 10 in the region between an upper bed 12 and a lower bed 13. The upper bed 12 is supported by a support grid 14. A distribution tray 15 is arranged above the lower bed 13. The region between the upper bed 12 and lower bed 13 is provided with a mixing device 20. The general configuration of the reactor will be conventional and details such as supports for the distribution tray are not shown for purposes of clarity.

In this embodiment, the wall 16 of the reactor 10 and the support grid 14 support an upper reaction bed 12 of solid contact material, e.g. catalyst 17, in particulate form, over which catalyst reactants flow and which are at least partially converted into product. The support grid 14 is provided with passages (not shown) and may be of conventional type. Catalyst 17 may be directly arranged on the support grid 14 (not shown) or the catalyst 17 may be arranged on a layer of support balls 18 arranged on the support grid 14. The support balls 18 permit liquid and gas to flow downwardly out of the upper bed 12 and through the support grid 14.

The mixing device 20 further comprises means for distributing a fluid, such as a quench fluid. These means comprise a loop of first nozzles 40 and a loop of second nozzles 50. Both the plurality of first nozzles 40 and the plurality of second nozzles 50 are distributed around a vertical axis, like the vertical axis 11 of the reactor. In the embodiment shown, these loops of nozzles are provided on one common tubular ring 23, also called a quench ring. The quench ring 23 is located between the support grid 14 and the distribution tray 15. Tubes 24 and 25 connect the quench ring 23 with a source (not shown) for the fluid to be ejected.

During normal operation, quench fluid can be emitted into the reactor through the first nozzles 40 and second nozzles 50 of the quench ring 23. Subsequent to ejection the fluid comes into contact with liquid and gas descending from the upper reaction bed 12 to the adjacent lower reaction bed 13. The quench fluid may be a reactant (e.g. hydrogen gas in a hydrotreating or hydrocracking process), a product of the process or an inert material.

Figure 1:
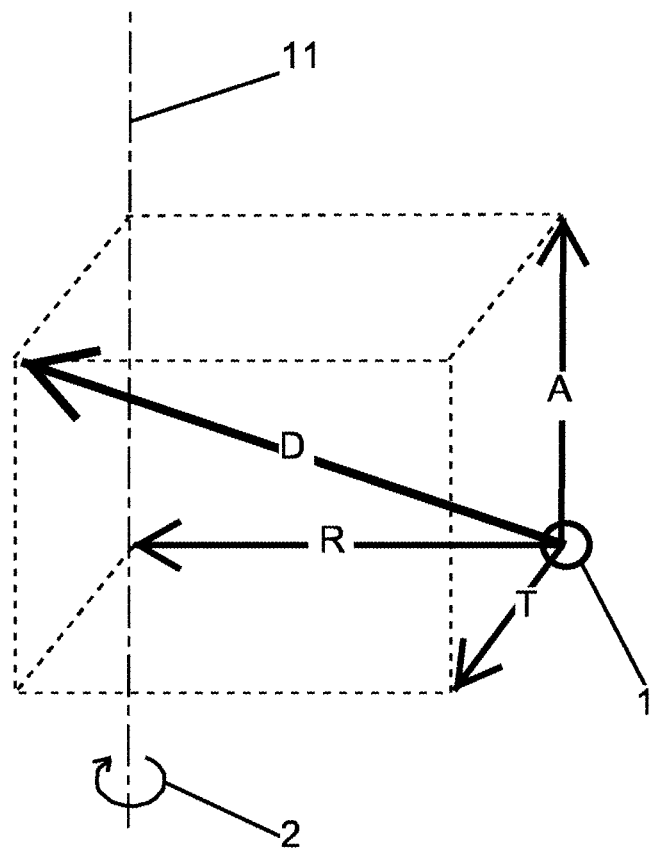
FIG. 1 shows schematically a 3-dimensional representation of a vector defined by a set of three orthogonal vector components.

Prior to more specifically discussing details of the invention, we will first discuss FIG. 1 in order to explain some general mathematical background used to define the invention.

Physical entities like forces, movements, speeds, directions etcetera can, in a 3D (three dimensional) environment, be expressed as a vector, like direction vector D in FIG. 1. Such a 3D-vector can be decomposed into vector components, one vector component for each dimension of the 3D environment. So vector D is represented in so to say three vector components. The sum of these three vector components then is vector D. A 3D environment can as such be created in several manners. A manner frequently used is the 3D environment defined by an orthogonal set of three vector components. In such an orthogonal set of three vector components, each vector component extends perpendicular with respect to both other vector components. Doing so with the direction vector D in FIG. 1, this direction vector D can be decomposed into a first vector component R, a second vector component A perpendicular to vector component R, and a third vector component T perpendicular to both the vector component R and vector component A. The sum of vectors R, A and T is equal to vector D.

For the purpose of defining the present invention, the vector components R, T and A are related to a vertical axis 11 around which the loop of first nozzles and the loop of second nozzles extend. This results in:
- a radial vector component R—called in the claims the first/second radial ejection vector—extending from the beginning of vector D to vertical axis 11 and being perpendicular to the vertical axis 11;
- an axial vector component A—called in the claims the first/second axial ejection vector—extending parallel to the vertical axis 11 and perpendicular to the radial vector component R;
- a tangential vector component T—called in the claims the first/second tangential ejection vector—extending in tangential direction with respect to the vertical axis 11 and perpendicular to both the radial vector component R and the axial vector component A.

Further referring to FIG. 1 and the claims: the circle 1 represents very schematically the surface opening of a nozzle (which surface opening has a normal vector perpendicular to said surface opening which coincides with the arrow D). Arrow D represents the direction of the fluid stream—called in the claims the ejection direction—emerging from the nozzle 1. The direction of the tangential vector T defines with respect to the vertical axis 11 a circumferential direction, which has been indicated in FIG. 1 as a circular arrow 2 around vertical axis 11.

Figure 3:
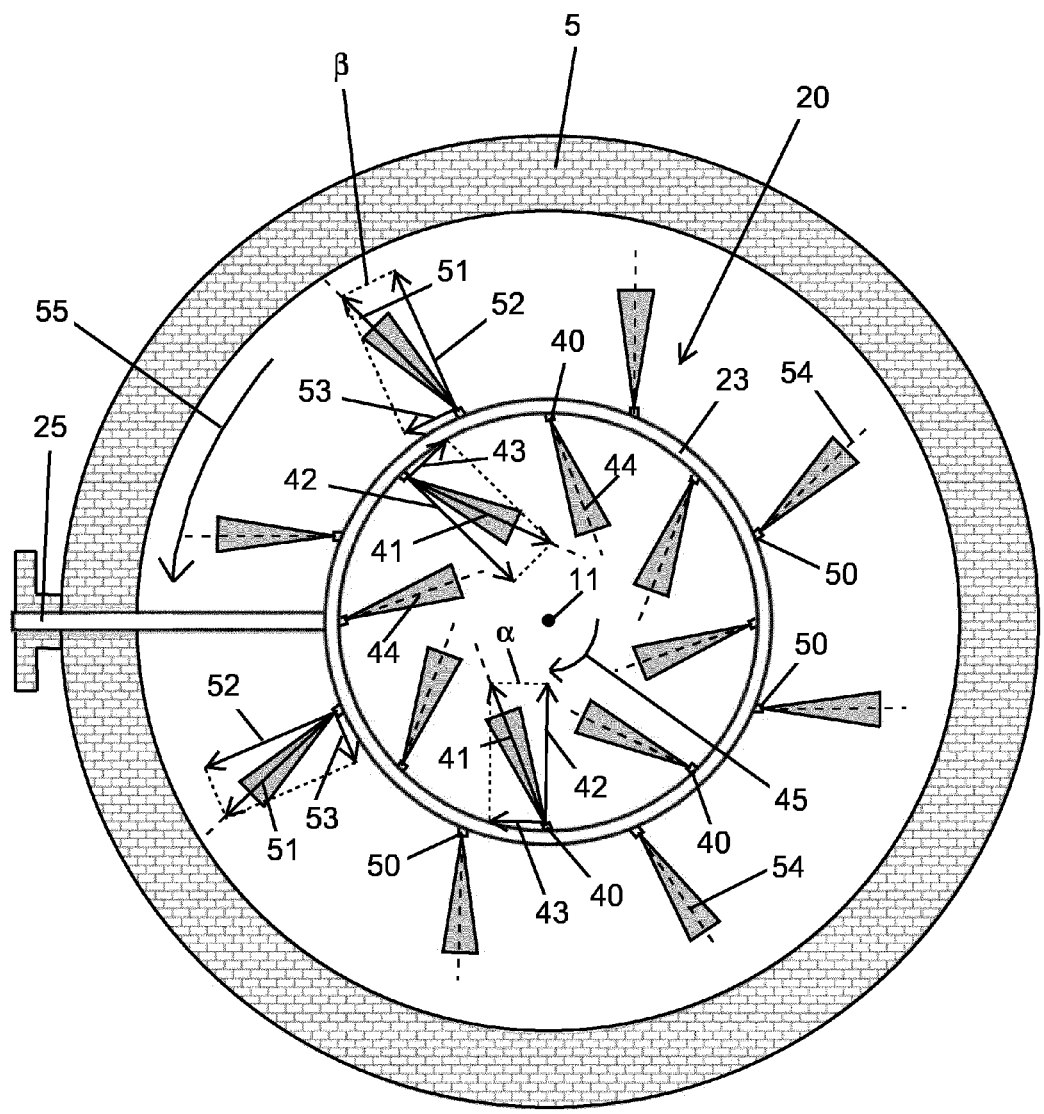
FIG. 3 shows a schematic view, according to arrows III in FIG. 2, onto a mixing device according to the invention.

Now, more detailed turning to the invention, FIG. 3 shows a view, according to arrows III of FIG. 2, onto the quench ring 23. This view shows the circular quench ring 23, the first ejection nozzles 40, and the second ejection nozzles 50. Further it can be seen that the fluid ejected from the first and second nozzles 40 and 50 has in this example the shape of a diverging cone. The so called ejection direction of each nozzle coincides with the center axis 41, 51 of the cone of the fluid ejected by each respective nozzle 40, 50.

In FIG. 3, the first ejection direction of a first nozzle 40 has been indicated with arrow 41 and the second ejection direction of a second nozzle 50 has been indicated with arrow 51 (only shown for two of the nozzles 40, 50). As follows from FIG. 3, each nozzle has its own ejection direction arrow. Correspondingly, the axial ejection vector, radial ejection vector and tangential ejection vector is defined locally for the ejection direction of each separate nozzle 40, 50. Consequently, arrow 42 indicates the first radial ejection vector for each first nozzle 40, arrow 43 indicates the first tangential ejection vector for each first nozzle 40, arrow 52 indicates the second radial ejection vector for each second nozzle 50, and arrow 53 indicates the second tangential ejection vector for each second nozzle 50. The first tangential ejection vectors 43 together define a first circumferential direction 45 around the vertical axis 11 and the second tangential ejection vectors 53 together define a second circumferential direction 55 around the vertical axis 11. As can be seen the first 45 and second 55 circumferential direction are in this embodiment opposite to each other, but it is also conceivable that they have the same direction.

Referring to FIGS. 1 and 3, the ejection directions 41 and 51 of FIG. 3 correspond with the vector D of FIG. 1, the radial ejection vectors 42 and 52 of FIG. 3 correspond with the vector R of FIG. 1, and the tangential ejection vectors 43 and 53 of FIG. 3 correspond with the vector T of FIG. 1. As in the embodiment of FIG. 3, the ejection directions 41 and 42 extend in a plane perpendicular to the vertical axis 11, the axial ejection vectors (extending perpendicular to the paper on which FIG. 3 is printed) have a length zero and are thus not shown.

The inter bed space 19 has an upper side defined by the support grid 14, an upper side defined by the distribution tray 15 and a side wall provided by the wall 16 of the reactor 10. The mixing device 20 is arranged inside the inter bed space. As one can see in FIG. 2, the inter bed space 19 is essentially free of constructional parts. The mixing device 20 is essentially the only constructional part arranged in the inter bed space 19, i.e. the mixing device 20 is in this embodiment the only means for mixing arranged inside the inter bed space. The distribution tray 15 and supporting grid 14 are arranged at the boundary, not at the inside of the inter bed space 19. The inter bed space has a height H and the mixing device is arranged at a vertical distance h above the distribution tray 15. For reasons of clarity, the vertical distance x is shown exaggerated. In practice, x might for example be about 10 cm, whilst h might, according to the invention, for example be about 20 cm.

As mentioned before, applicant found that adding a loop of outwardly facing second nozzles to a loop of inwardly facing first nozzles enables a considerable increase in the performance of a multiple bed down flow reactor. This is illustrated by simulative calculations on cases A, B and C, the results of which are shown in Table 1 below.

The simulative calculations were done for a reactor as shown in FIGS. 2 and 3, which reactor has an internal diameter D and a quench ring 23 with a diameter d=0.8 D.

Case A is a situation with only inwardly directed nozzles 40 and without outwardly directed nozzles 50. The number of inwardly directed nozzles 40 is 2n, and all inwardly directed nozzles 40 have an angle α of 20° with respect to the radial ejection vector 42. [number of outwardly directed nozzles is zero]

Case B is a situation with both inwardly directed nozzles 40 and outwardly directed nozzles 50. The number of inwardly directed nozzles is n and the number of outwardly directed nozzles is also n. The inwardly directed nozzles 40 have an angle α of 20° with respect to the radial ejection vector 42. The outwardly directed nozzles 50 have an angle β of 20° with respect to the radial ejection vector 42. The circumferential direction 45 defined by the inwardly facing nozzles 40 was opposite to the circumferential direction 55 of the outwardly facing nozzles 50 (i.e. the situation as shown in FIG. 3)

Case C is a situation with both inwardly directed nozzles 40 and outwardly directed nozzles 50. The number of inwardly directed nozzles is n and the number of outwardly directed nozzles is also n. The inwardly directed nozzles 40 have an angle α of 20° with respect to the radial ejection vector 42. The outwardly directed nozzles 50 have an angle β of 20° with respect to the radial ejection vector 42. The circumferential direction 45 defined by the inwardly facing nozzles 40 was the same as the circumferential direction 55 of the outwardly facing nozzles 50 (i.e. the situation opposite to the situation as shown in FIG. 3).

Table 1 gives for each height level the "standard deviation of the temperature of the medium at height level Z" divided through "the average of the temperature of the medium at height level Z". Z=0 mm corresponds with the upperside of the distribution tray 15 and z=190 mm corresponds with the underside of the support grid 14. The quench ring 23 was arranged at an height h of 188 mm. From Table 1 it follows that in Case A the "standard deviation/average temperature" is at Z=5 mm $3.2 \times 10^{-3}$, whilst in Cases B and C this value for the "standard deviation/average temperature" is already achieved at z=120 mm above the distribution tray 15. This means that it is possible to reduce the height of the inter bed space 19 with about 120 mm. This reduction of the height of the inter bed space 19 means that the reactor can contain more beds or catalyst. It also follows from Table 1 that Case B seems favorable over Case C.

TABLE 1

| (Standard deviation of T/Average of T) at height-position Z in mm, for cases A, B and C | | | | | | |
|---|---|---|---|---|---|---|
| Z = 190 | Z = 170 | Z = 145 | Z = 120 | Z = 100 | Z = 75 | Z = 5 |
| A 1.7E−02 | 1.4E−02 | 1.2E−02 | 1.1E−02 | 9.6E−03 | 7.8E−03 | 3.2E−03 |
| B 2.4E−02 | 6.3E−03 | 3.9E−03 | 2.9E−03 | 2.7E−03 | 2.5E−03 | 2.5E−03 |
| C 2.4E−02 | 5.9E−03 | 3.9E−03 | 3.0E−03 | 2.8E−03 | 2.7E−03 | 2.8E−03 |

That which is claimed is:

1. A multiple-bed downflow reactor comprising vertically spaced beds of solid contact material and a mixing device positioned in an inter bed space between adjacent beds, wherein the mixing device comprises:
   a loop of first nozzles distributed around a vertical axis and arranged for ejecting a fluid in a first ejection direction into said inter bed space;
   a loop of second nozzles distributed around the vertical axis and arranged for ejecting a fluid in a second ejection direction into said inter bed space;
   wherein, for each first nozzle, the first ejection direction is represented in a local orthogonal set of three first ejection vectors comprised of a first radial ejection vector extending perpendicular to the vertical axis, a first axial ejection vector extending parallel to the vertical axis and a first tangential ejection vector extending tangentially with respect to the vertical axis;
   wherein the first ejection directions and associated first radial ejection vectors of said first ejection nozzles define an angle (α) of more than 5°;
   wherein, for each second nozzle, the second ejection direction is represented in a local orthogonal set of three second ejection vectors comprised of a second radial ejection vector extending perpendicular to the vertical axis, a second axial ejection vector extending parallel to the vertical axis and a second tangential ejection vector extending tangentially with respect to the vertical axis;
   wherein the first radial ejection vectors are directed to the vertical axis whilst the second radial ejection vectors are directed away from the vertical axis;
   wherein the first tangential ejection vectors define a first circumferential direction around the vertical axis, and wherein the second tangential ejection vectors define a second circumferential direction around the vertical axis, and
   wherein the first and second circumferential direction are opposite to each other.

2. A reactor according to claim 1, wherein the first axial ejection vector or the second axial ejection vector, or both, have a length of zero.

3. A reactor according to claim 1, wherein the first ejection directions and associated first radial ejection vectors of said first ejection nozzles define an angle (α) of at most 35°.

4. A reactor according to claim 1, wherein the second ejection directions and associated second radial ejection vectors of said second ejection nozzles define an angle (β) of more than 5°.

5. A reactor according to claim 4, wherein the second ejection direction and associated second radial ejection vectors of said second ejection nozzles define an angle (β) of at most 35°.

6. A reactor according to claim 1, wherein the second ejection directions and associated second radial ejection vectors of said second ejection nozzles define an angle (β) in the range of from 0° to 35°.

7. A reactor according to claim 1, wherein the mixing device further comprises a tubular ring carrying the first nozzles or the second nozzles.

8. A reactor according to claim 1, comprising a reactor vessel housing said vertically spaced beds and inter bed spaces between adjacent beds, wherein each bed comprises a support grid defining the lower side of the bed and a distribution tray defining the upper side of the bed, wherein the upper side of each inter bed space is defined by the support grid of the adjacent bed above said inter bed space, wherein the lower side of each inter bed space is defined by the distribution tray of the adjacent bed below said inter bed space, wherein the mixing device is arranged in the inter bed space.

9. A reactor according to claim 8, wherein the inter bed space is, except for the mixing device, essentially empty of other constructional parts.

10. A mixing method for distributing a fluid into a liquid and/or gas in a multiple-bed downflow reactor having an inter bed space between two adjacent beds, wherein the method comprises:
- the step of ejecting the fluid into the inter bed space with a loop of first nozzles and a loop of second nozzles;
- wherein both the first and second nozzles are distributed around a vertical axis of the reactor and arranged in the inter bed space;
- wherein each first nozzle ejects the fluid in a first ejection direction and each second nozzle ejects the fluid in a second ejection direction;
- wherein, for each first nozzle, the first ejection direction is represented in a local orthogonal set of three first ejection vectors comprised of a first radial ejection vector extending perpendicular to the vertical axis, a first axial ejection vector extending parallel to the vertical axis and a first tangential ejection vector extending tangentially with respect to the vertical axis;
- wherein, for each second nozzle, the second ejection direction is represented in a local orthogonal set of three second ejection vectors comprised of a second radial ejection vector extending perpendicular to the vertical axis, a second axial ejection vector extending parallel to the vertical axis and a second tangential ejection vector extending tangentially with respect to the vertical axis;
- wherein the first ejection directions and associated first radial ejection vectors of said first ejection nozzles define an angle ($\alpha$) of more than 5°;
- wherein the first radial ejection vectors are directed to the vertical axis whilst the second radial ejection vectors are directed away from the vertical axis;
- wherein the first tangential ejection vectors define a first circumferential direction around the vertical axis, and wherein the second tangential ejection vectors define a second circumferential direction around the vertical axis, and
- wherein the first and second circumferential direction are opposite to each other.

* * * * *